United States Patent
Windebank et al.

(10) Patent No.: US 7,737,091 B2
(45) Date of Patent: Jun. 15, 2010

(54) PROPPANTS AND ANTI-FLOWBACK ADDITIVES MADE FROM SILLIMANITE MINERALS, METHODS OF MANUFACTURE, AND METHODS OF USE

(75) Inventors: Mark Windebank, Par (GB); Jarrod Hart, Truro (GB); Jean Andre Alary, L'Isle sur la Sorgue (FR)

(73) Assignee: Imerys, Paris (FR)

( * ) Notice: Subject to any disclaimer, the term of this patent is extended or adjusted under 35 U.S.C. 154(b) by 240 days.

(21) Appl. No.: 11/846,261

(22) Filed: Aug. 28, 2007

(65) Prior Publication Data

US 2009/0062154 A1    Mar. 5, 2009

(51) Int. Cl.
*C04B 33/00* (2006.01)
*C09K 8/58* (2006.01)

(52) U.S. Cl. ............... 507/200; 507/209; 507/904; 507/906; 501/141

(58) Field of Classification Search ............... 507/200, 507/209, 904, 906; 510/141
See application file for complete search history.

(56) References Cited

U.S. PATENT DOCUMENTS

| 4,921,820 A | 5/1990 | Rumpf et al. | |
|---|---|---|---|
| 5,030,603 A | 7/1991 | Rumpf et al. | |
| 2006/0177661 A1* | 8/2006 | Smith et al. | 428/403 |
| 2007/0202318 A1 | 8/2007 | Smith et al. | |
| 2008/0053657 A1* | 3/2008 | Alary et al. | 166/280.2 |

FOREIGN PATENT DOCUMENTS

| WO | WO 03/042497 A1 | 5/2003 |
|---|---|---|
| WO | WO 2006/082416 A1 | 8/2006 |
| WO | WO 2008/018966 A2 | 2/2008 |
| WO | WO 2008/026076 A2 | 3/2008 |
| WO | WO 2008/094069 A2 | 8/2008 |

OTHER PUBLICATIONS

Marie-Laure Bouchetou, Jean-Pierre Ildefonse, Jacques Poirier, Pierre Daniellou, *Mullite Grown from Fired Andalusite Grains: The Role of Impurities and of the High Temperature Liquid Phase on the Kinetics of Mullitization and Consequences on Thermal Shocks Resistance*Ceramics International 31 (2005) 999-1005; Elsevier Ltd and Techna Group S.r.I.
Srikrishna, K., et al., "Kaolinite-mullite reaction series: a TEM study", Journal of Materials Science, vol. 25, Jan. 1990, pp. 607-612.
Blair, G.R., et al., "Kaolinite-Mullite Series: Firing vs. Reactive-Hot Pressing", Journal of Thermal Analysis, vol. 4, Jan. 1972, pp. 311-322.
International Search Report issued Jun. 30, 2009, for counterpart PCT Application No. PCT/IB2008/003074.
Written Opinion of the International Searching Authority issued Jun. 30, 2009, for counterpart PCT Application No. PCT/IB2008/003074.

* cited by examiner

*Primary Examiner*—Timothy J. Kugel
(74) *Attorney, Agent, or Firm*—Finnegan, Henderson, Farabow, Garrett & Dunner, L.L.P.

(57) ABSTRACT

Spherical and rod-shaped proppants and anti-flowback agents made from sillimanite minerals possess high strength and high conductivity. The sillimanite minerals may be selected from the group consisting of kyanite, sillimanite, and andalusite and may be used alone or in combination with other materials, such as bauxite, kaolin, meta-kaolin, pure or technical grade alumina (about 98%-99.9% alumina by weight), alumina-containing slag, zirconia, silica, iron, alkali elements (such as calcium, magnesium, and sodium), and virtually any other mineral containing alumina. The starting material may optionally be milled to achieve better compacity and crush resistance in the final proppant or anti-flowback agent. A fracturing fluid may comprise the rods or spheres alone, or in combination with each other or other proppants or anti-flowback agents of different shapes.

93 Claims, 4 Drawing Sheets

PROPPANTS AND ANTI-FLOWBACK ADDITIVES MADE FROM SILLIMANITE MINERALS, METHODS OF MANUFACTURE, AND METHODS OF USE

FIELD OF THE INVENTION

The present invention relates to a proppant for fractured earth having a high compressive strength and simultaneously a good conductivity. It also relates to an anti-flowback additive for use in fracturing operations.

BACKGROUND

Naturally occurring deposits containing oil and natural gas have been located throughout the world. Given the porous and permeable nature of the subterranean structure, it is possible to bore into the earth and set up a well where oil and natural gas are pumped out of the deposit. These wells are large, costly structures that are typically fixed at one location. As is often the case, a well may initially be very productive, with the oil and natural gas being pumpable with relative ease. As the oil or natural gas near the well bore is removed from the deposit, other oil and natural gas may flow to the area near the well bore so that it may be pumped as well. However, as a well ages, and sometimes merely as a consequence of the subterranean geology surrounding the well bore, the more remote oil and natural gas may have difficulty flowing to the well bore, thereby reducing the productivity of the well.

To address this problem and to increase the flow of oil and natural gas to the well bore, companies have employed the well-known technique of fracturing the subterranean area around the well to create more paths for the oil and natural gas to flow toward the well. As described in more detail in the literature, this fracturing is accomplished by hydraulically injecting a fluid at very high pressure into the area surrounding the well bore. This fluid must then be removed from the fracture to the extent possible to ensure that it does not impede the flow of oil or natural gas back to the well bore. Once the fluid is removed, the fractures have a tendency to collapse due to the high compaction pressures experienced at well-depths, which can be more than 20,000 feet. To prevent the fractures from closing, it is well known to include a propping agent, also known as a proppant, in the fracturing fluid. The goal is to be able to remove as much of the injection fluid as possible while leaving the proppant behind to keep the fractures open. As used in this application, the term "proppant" refers to any non-liquid material that is present in a proppant pack and provides structural support in a propped fracture. "Anti-flowback additive" refers to any material that is present in a proppant pack and reduces the flowback of proppant particles but still allows for production of oil at sufficient rates. The terms "proppant" and "anti-flowback additive" are not necessarily mutually exclusive, so a single particle type may meet both definitions. For example, a particle may provide structural support in a fracture and it may also be shaped to have anti-flowback properties, allowing it to meet both definitions.

Several properties affect the desirability of a proppant. For example, for use in deep wells or wells whose formation forces are high, proppants must be capable of withstanding high compressive forces, often greater than 10,000 pounds per square inch ("psi"). Proppants able to withstand these forces (e.g., up to and greater than 10,000 psi) are referred to as high strength proppants. If forces in a fracture are too high for a given proppant, the proppant will crush and collapse, and then no longer have a sufficient permeability to allow the proper flow of oil or natural gas. Other applications, such as for use in shallower wells, do not demand the same strength proppant, allowing intermediate strength proppants to suffice. These intermediate strength proppants are typically used where the compressive forces are between 5,000 and 10,000 psi. Still other proppants can be used for applications where the compressive forces are low. For example, sand is often used as a proppant at low compressive forces.

In addition to the strength of the proppant, one must consider how the proppant will pack with other proppant particles and the surrounding geological features, as the nature of the packing can impact the flow of the oil and natural gas through the fractures. For example, if the proppant particles become too tightly packed, they may actually inhibit the flow of the oil or natural gas rather than increase it.

The nature of the packing also has an effect on the overall turbulence generated through the fractures. Too much turbulence can increase the flowback of the proppant particles from the fractures toward the well bore. This may undesirably decrease the flow of oil and natural gas, contaminate the well, cause abrasion to the equipment in the well, and increase the production cost as the proppants that flow back toward the well must be removed from the oil and gas. Too much turbulence can also increase the Non-Darcy flow effect, discussed in more detail below, which may ultimately result in decreased conductivity.

The useful life of the well may also be shortened if the proppant particles break down. For this reason, proppants have conventionally been designed to minimize breaking. For example, U.S. Pat. No. 3,497,008 to Graham et al. discloses a preferred proppant composition of a hard glass that has decreased surface flaws to prevent failure at those flaws. It also discloses that the hard glass should have a good resistance to impact abrasion, which serves to prevent surface flaws from occurring in the first place. These features have conventionally been deemed necessary to avoid breaking, which creates undesirable fines within the fracture.

The shape of the proppant has a significant impact on how it packs with other proppant particles and the surrounding area. Thus, the shape of the proppant can significantly alter the permeability and conductivity of a proppant pack in a fracture. Different shapes of the same material offer different strengths and resistance to closure stress. It is desirable to engineer the shape of the proppant to provide high strength and a packing tendency that will increase the flow of oil or natural gas. The optimum shape may differ for different depths, closure stresses, geologies of the surrounding earth, and materials to be extracted.

The conventional wisdom in the industry is that spherical pellets of uniform size are the most effective proppant body shape to maximize the permeability of the fracture. See, e.g., U.S. Pat. No. 6,753,299 to Lunghofer et al. Indeed, the American Petroleum Institute's ("API's") description of the proppant qualification process has a section dedicated to the evaluation of roundness and sphericity as measured on the Krumbein scale. However, other shapes have been suggested in the art. For example, previously-mentioned U.S. Pat. No. 3,497,008 to Graham et al. discloses the use of "particles having linear, parallel, opposite surface elements including cylinders, rods, paralellepipeds, prisms, cubes, plates, and various other solids of both regular and irregular configurations." (Col. 3, lines 34-37.) According to that patent, the disclosed shape configuration has several advantages when used as a proppant, including increased conductivity over spherical particles (col. 4, lines 29-35), greater load bearing capacity for the same diameter as a spherical particle (col. 4, lines 36-38), a higher resistance to being embedded in the fracture wall (col. 4, lines 45-47), and a lower settling rate (col. 4, lines 58-60).

Another property that impacts a proppant's utility is how quickly it settles both in the injection fluid and once it is in the fracture. A proppant that quickly settles may not reach the desired propping location in the fracture, resulting in a low level of proppants in the desired fracture locations, such as high or deep enough in the fracture to maximize the presence of the proppant in the pay zone (i.e., the zone in which oil or natural gas flows back to the well). This can reduce the effectiveness of the fracturing operation. Ideally, a proppant disperses equally throughout all portions of the fracture. Gravity works against this ideal, pulling particles toward the bottom of the fracture. However, proppants with properly engineered densities and shapes may be slow to settle, thereby increasing the functional propped area of the fracture. How quickly a proppant settles is determined in large part by its apparent specific gravity. Engineering the apparent specific gravity of the proppant for various applications is desirable because an optimized apparent specific gravity allows a proppant user to better place the proppant within the fracture.

Yet another attribute to consider in designing a proppant is its acid-tolerance, as acids are often used in oil and natural gas wells and may undesirably alter the properties of the proppant. For example, hydrofluoric acid is commonly used to treat oil wells, making a proppant's resistance to that acid of high importance.

Still another property to consider for a proppant is its surface texture. A surface texture that enhances, or at least does not inhibit, the conductivity of the oil or gas through the fractures is desirable. Smoother surfaces offer certain advantages over rough surfaces, such as reduced tool wear and a better conductivity, but porous surfaces may still be desirable for some applications where a reduced density may be useful.

All of these properties, some of which can at times conflict with each other, must be weighed in determining the right proppant for a particular situation. In addition, one must also consider the economics of the operation, because stimulation of a well through fracturing is by far the most expensive operation over the life of the well. Proppants are typically used in large quantities, making them a large part of the stimulation cost.

Attempts have been made to optimize proppants and methods of using them. Suggested materials for proppants include sand, glass beads, ceramic pellets, and portions of walnuts. The preferred material disclosed in previously-mentioned U.S. Pat. No. 3,497,008 is a hard glass, but it also mentions that sintered alumina, steatite, and mullite could be used. Conventional belief is that alumina adds strength to a proppant, so many early proppants were made of high-alumina materials, such as bauxite. The strength of these high-alumina materials is believed to be due to the mechanical properties of the dense ceramic materials therein. See, e.g., U.S. Pat. Nos. 4,068,718 and 4,427,068, both of which disclose proppants made with bauxite.

Early high strength proppants were made using tabular alumina, which was a relatively expensive component. For this reason, the industry shifted from using tabular alumina to other alumina sources, such as bauxite. By the late 1970's, the development focus in the industry shifted from high strength proppants to intermediate or lower strength, lower density proppants that were easier to transport and use, and were less expensive. Over the next 20 years, the industry focused on commercialization of lower density proppants and they became commonly used. The primary method of reducing the density of proppants is to replace at least a portion of the higher density alumina with lower density silica. According to U.S. Pat. No. 6,753,299, "the original bauxite based proppants of the early 1970's contained >80% alumina (Cooke). Subsequent generations of proppants contained an alumina content of >70% (Fitzgibbons), 40% to 60% (Lunghofer), and later 30% to <40% (Rumpf, Fitzgibbons)." Thus, as to both product development and proppant use, there was a retreat in the industry from proppants manufactured from high-alumina materials.

As resources become more scarce, the search for oil and gas involves penetration into deeper geological formations, and the recovery of the raw materials becomes increasingly difficult. Therefore, there is a need for proppants that have an excellent conductivity and permeability under extreme conditions, and the industry has taken a renewed interest in materials containing larger amounts of alumina. The problem is that conventional sources of high-alumina materials are rapidly being depleted. Meanwhile, demand continues to increase for the increasingly scarce materials. Thus, there is a need for a new proppant material that exists in ample supply and that can offer the strength required to prop fractures in modern wells.

SUMMARY OF THE INVENTION

According to one embodiment consistent with the present invention, a proppant or anti-flowback additive is provided comprising a sintered sillimanite mineral. A method of fracturing subterranean formations is also provided that comprises injecting a fluid comprising a first composition comprising a sintered sillimanite mineral. A method of making a proppant or anti-flowback additive is also provided that comprises sintering at least one sillimanite mineral to form a proppant or anti-flowback additive. In another embodiment consistent with the present invention, a proppant or anti-flowback additive is provided comprising mullite and silica wherein the mullite crystals are substantially parallel.

DESCRIPTION OF THE INVENTION

Figure 1:
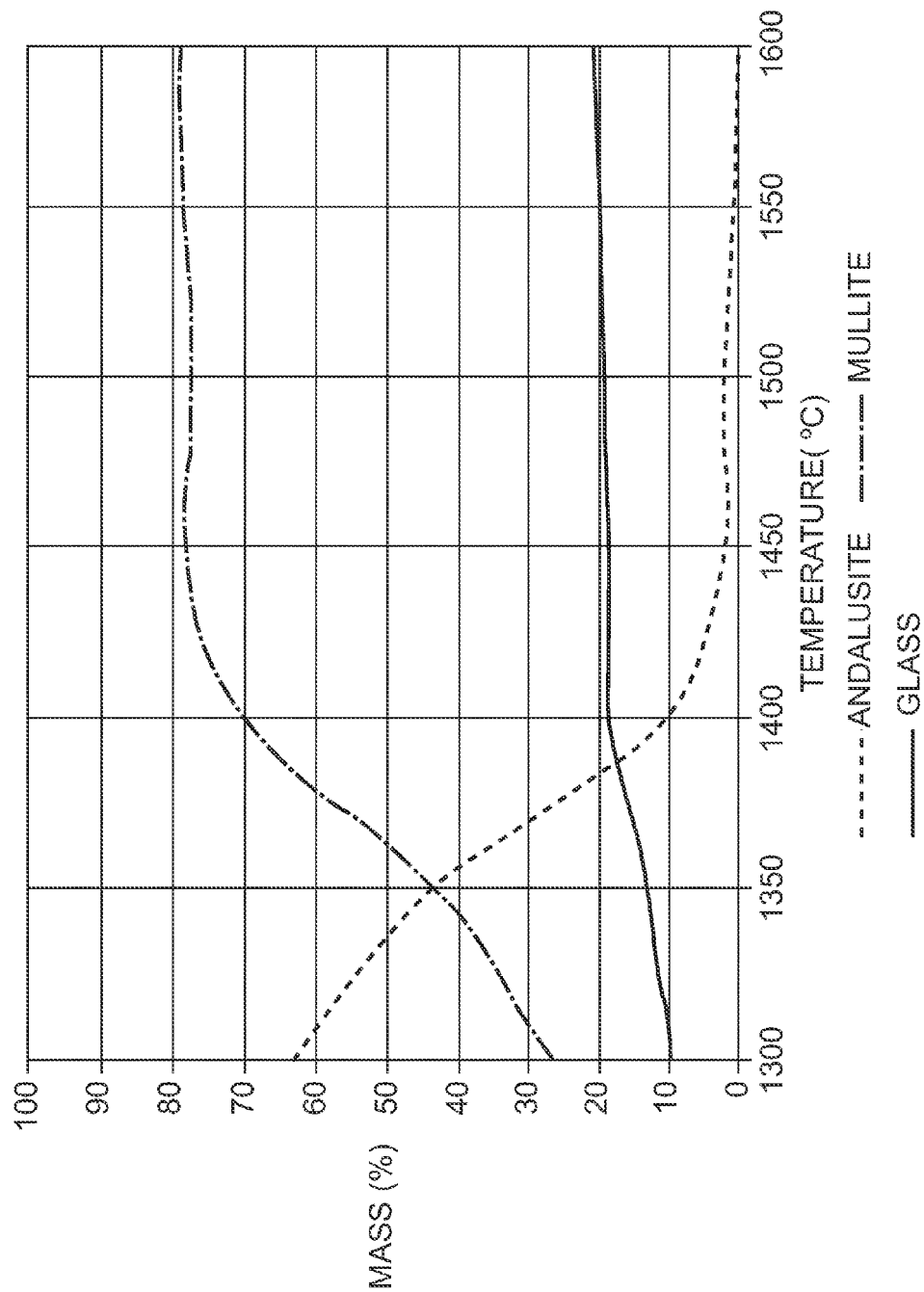
FIG. 1 is a chart illustrating mullitization of andalusite from 1300° C. to 1600° C.

Reference will now be made in detail to embodiments of the present invention. A high strength proppant and anti-flowback additive made using sillimanite minerals is found to achieve superior conductivity and other benefits when used in hydraulic fracturing of subterranean formations surrounding oil and/or gas wells under relatively high closing pressures.

The sillimanite minerals are polymorphic forms of the same chemical composition, namely $Al_2SiO_5$. They include kyanite, sillimanite, and andalusite. Kyanite has a triclinic crystal system, with (001) being the orientation of the indented plane. Sillimanite also has an orthorhombic crystal system, but the orientation of the indented plane is (010). Andalusite has an orthorhombic crystal system, and the orientation of the indented plane is (001). The examples given in this application pertain primarily to andalusite embodiments of the claimed invention, but those skilled in the art will recognize that any sillimanite mineral will behave similar to andalusite and may be used.

Andalusite is primarily mined in South Africa and France, as well as China and Spain, although other deposits throughout the world exist. Although the properties of andalusite vary from mine to mine (e.g., the amount of impurities may vary, etc.), suitable andalusite for use in the present invention may be mined from virtually any andalusite deposit in the world. More particularly, andalusite for the present invention is not limited to the andalusite ores considered suitable for refractory applications. For example, andalusite ores containing higher levels of one or more components that are not compatible with high temperature applications can be used in the present invention. Such components include but are not limited to iron, calcium and potassium. The mining process is known to those skilled in the art, and may involve various wet or dry milling techniques; classification using, for example, air classifiers, screw classifiers, and/or screens; purification through, for example, electrostatic separation, magnetic separation, and/or flotation; and drying. Although mining is a common way to obtain andalusite, one may also use the fines generated during andalusite refining processes. Those fines are often discarded when the andalusite is refined for use in other industries, but they may be used to prepare proppants or anti-flowback additives consistent with embodiments of the present invention.

Various concentrates of andalusite are commercially available, and have alumina contents from about 46% to about 61% by weight. The silica content of those concentrates may range from about 38% to about 51% by weight. Several suitable grades are available from DAMREC, including those available under the trade names Kerphalite®, Durandal®, KS®, Purusite®, Krugerite®, and Randalusite®.

When exposed to high temperatures (e.g., sintering conditions of ceramic materials), the sillimanite minerals decompose through the formation of two new phases, a glassy silica phase and a "stoichiometric" mullite phase (or "3:2 mullite" phase). Chemically, the decomposition proceeds as follows:

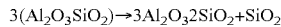

$$3(Al_2O_3SiO_2) \rightarrow 3Al_2O_3 2SiO_2 + SiO_2$$

Decomposition into mullite (also referred to as "mullitization") generally starts to occur at or above about 1250° C. FIG. 1 illustrates mullitization of andalusite from 1300° C. to 1600° C. As shown, at 1300° C. the andalusite has already begun to mullitize, leaving about 60% andalusite, about 30% mullite, and about 10% of a glassy silica phase. After a sufficient amount of time at 1600° C., there is virtually no andalusite remaining, having been converted to about 80% mullite and about 20% silica.

Large amounts of silica (e.g., greater than about 2% by weight) have conventionally been considered detrimental to a proppant's strength. This is because the silica in the art has typically been "free" silica, which tends to coalesce and form weak seams in the crystalline structure. In contrast to conventional "free" silica that is a by-product of the sintering of kaolin or clay based proppants, a substantial amount of the silica released by mullitization of the andalusite is trapped within the resulting mullite crystal structure, thus creating a composite material. Instead of all of the silica generated during mullitization coalescing, a significant amount of the silica is trapped in microcanals within the mullite crystalline matrix. There are at least two benefits to proppants manufactured from the mullitization of andalusite. First, the weak seams that typically form in, for example, sintered kaolin or clay based proppants can be greatly reduced in proppants made from sillimanite minerals, as far less free silica is available to coalesce and form weak seams. The second benefit from this composite structure is that it allows the production of strong proppants having a lower density due to a higher silica content. Strong proppants having silica contents as high as 20% by weight are possible with sillimanite minerals. Because silica is lighter than mullite and many proppant additives, the increased silica content results in a proppant or anti-flowback additive with a reduced apparent specific gravity. The practical advantages of a reduced apparent specific gravity will be readily apparent to those skilled in the art, and include, among other things, reduced transportation costs, improved pumpability, and improved placement in a fracture.

Figure 2A:
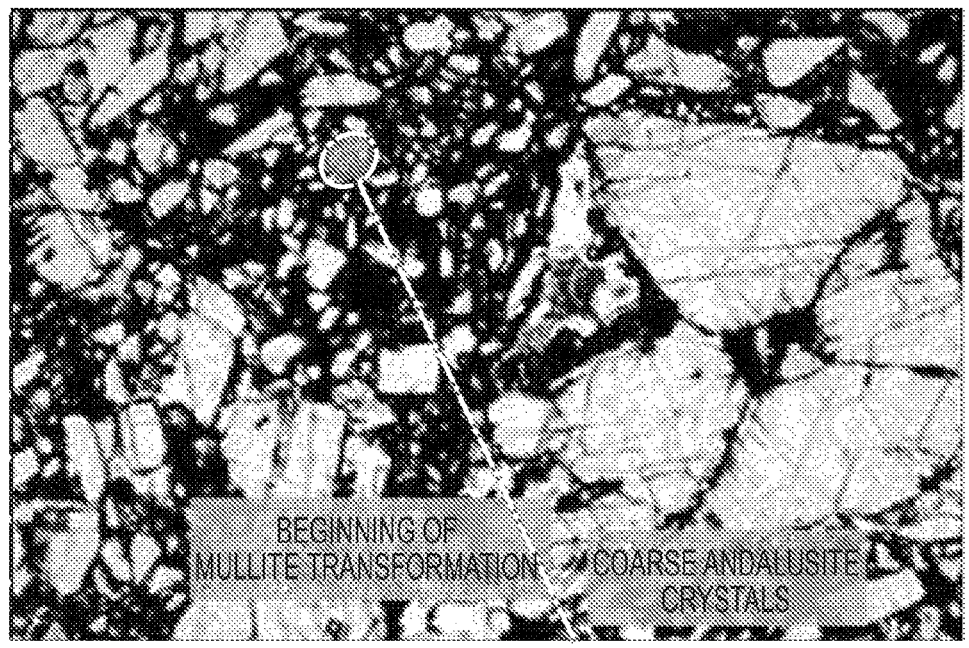
FIGS. 2A and 2B illustrate the transformation that occurs when andalusite forms mullite and silica at 1300° C.
Figure 2B:
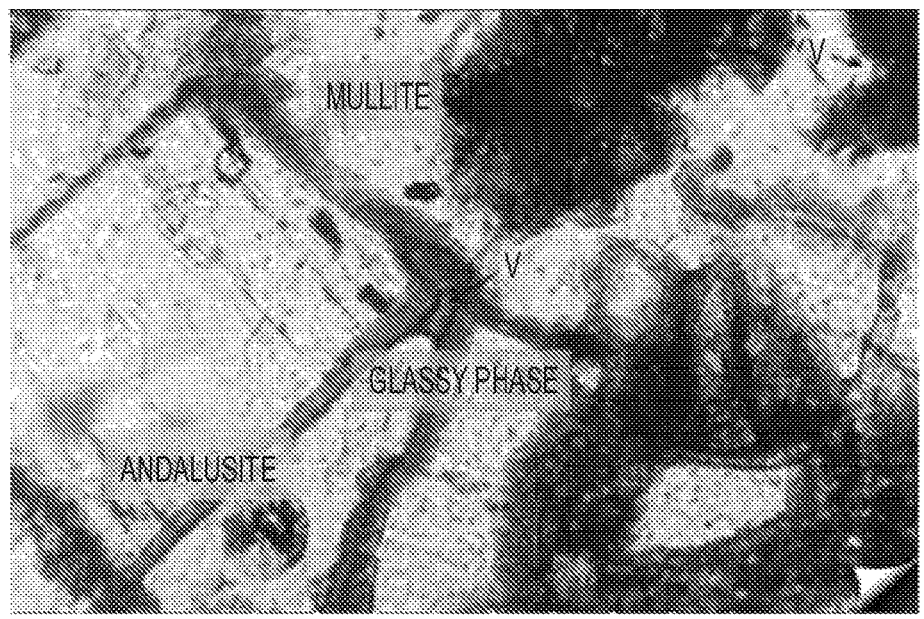

FIGS. 2A, 2B, 3A, and 3B illustrate the transformation that occurs when andalusite forms mullite and silica. FIGS. 2A and 2B show the early stages of mullitization at 1300° C. Coarse andalusite crystals dominate the figure, with smaller amounts of mullite and a glassy phase also existing. The mullitization begins at the crystal edges and cracks. It then progresses toward the pure andalusite zones.

Figure 3A:
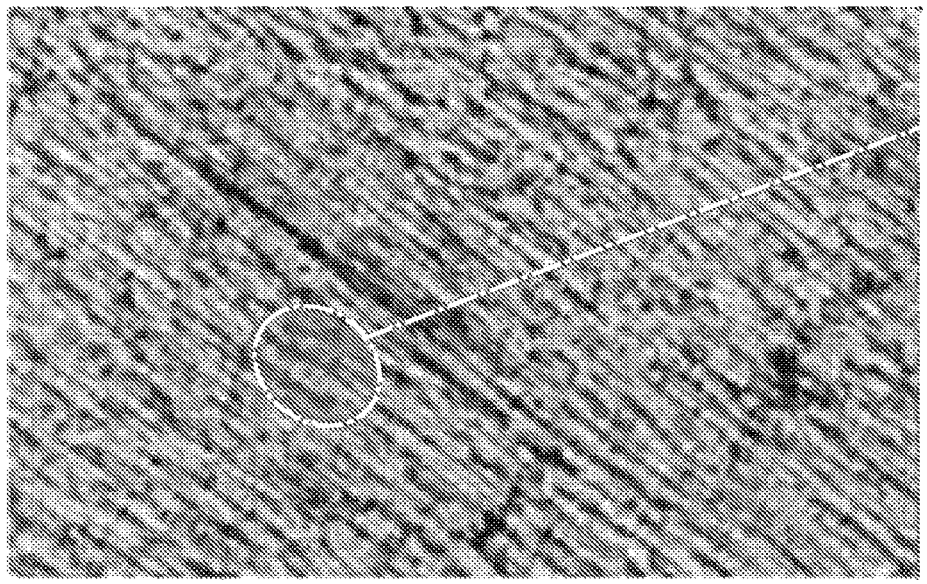
FIGS. 3A and 3B illustrate the result of a mullitization process at 1600° C.
Figure 3B:
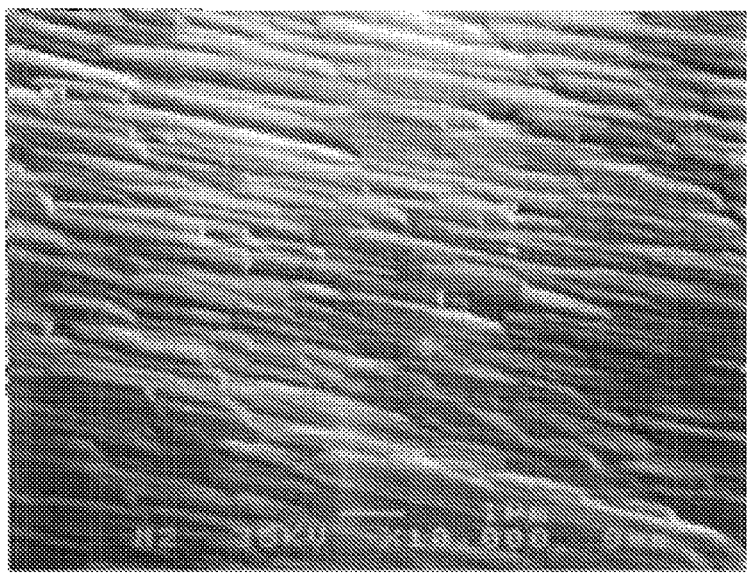

FIGS. 3A and 3B illustrate the result of the mullitization process at 1600° C. As shown, the mullite crystals are aligned substantially in parallel with the same crystallographic orientation—a feature believed to enhance the strength of the resultant proppant. As used in this application, a "substantially parallel" crystal structure refers to a structure that is approximately parallel, but not necessarily parallel, and includes, for example, the crystalline structure that results when andalusite mullitizes. Those skilled in the art will appreciate that determining the crystallographic orientation may be conducted by standard optical examination or examination under a scanning electron microscope.

The mullitization of sillimanite minerals such as andalusite results in a consistent material with a relatively homogeneous apparent specific gravity of the final proppant or anti-flowback additive. Indeed the chemical composition of the sillimanite minerals can be quite stable in the final product, with variation often falling below 0.5% of the total weight of the material. This allows fracturing engineers better control over the fracturing process, allowing the material to be deposited more accurately. In contrast, clay materials such as kaolin typically result in more variability in the final product, depending on the impurities present inside the deposit. Those skilled in the art will appreciate that variability makes the resultant proppant or anti-flowback additive more difficult to use in designing and carrying out a fracturing operation.

Figure 4:
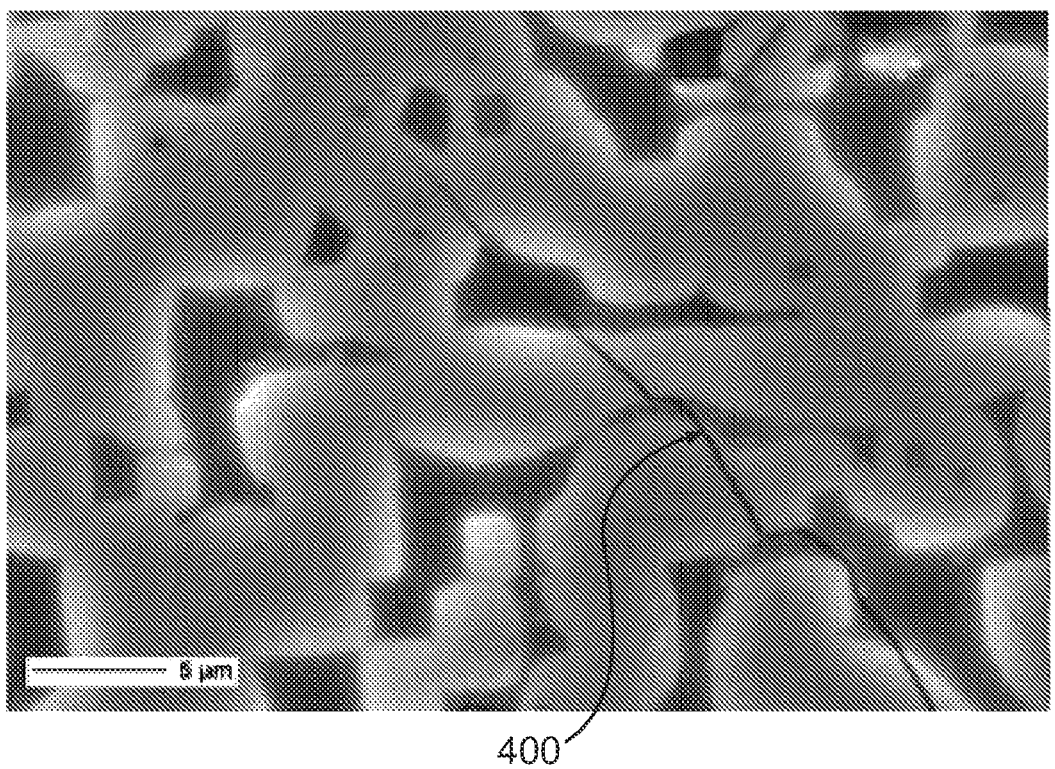
FIG. 4 illustrates an example of the cracking behavior of mullitized andalusite.

Mullitized sillimanite minerals also offer the advantage of improved breaking behavior due to their energy absorbing failure method. When exposed to pressures sufficient to crack the material, the resultant crack takes an energy absorbing zig-zagging path through the material, with each change in direction resulting in more energy being absorbed. FIG. 4 illustrates this behavior in mullitized andalusite, with line 400 representing a crack in the material. As shown, the fracture progression is blocked by the successive crystal phase changes, thereby resulting in a higher strength structure than other materials having the same density. Such a structure is optimal for materials required to withstand substantial load or physical stress. Additional details on this breaking behavior can be found in IIdefonse et al., *Mullite Grown from Fired Andalusite Grains: The Role of Impurities and of the High Temperature Liquid Phase on the Kinetics of Mullitization and Consequences on Thermal Shocks Resistance*, 31 Ceramics International 999-1005 (2005).

The andalusite may be mixed with other additives to form the proppant or anti-flowback additive. For example, additives such as bauxite, kaolin, meta-kaolin, pure or technical grade alumina (about 98%-99.9% alumina by weight), alumina-containing slag, zirconia, silica, iron, alkali elements, such as calcium, magnesium, and sodium, and virtually any other mineral containing alumina may be used to provide added strength or to decrease the apparent specific gravity of the resultant proppant. To enhance plasticity or green strength, other additives such as smectites (including, for example, montmorillinite and bentonite) or other rheology modifiers may be added. Appropriate additives may be selected by those skilled in the art based on the goal of the blend. For example, bauxite may be selected to enhance the crush resistance of a mullitized andalusite proppant. Alternatively, kaolin may be selected to reduce the apparent specific gravity of the proppant.

Strength optimized, light-weight proppants consistent with embodiments of the present invention may have various shapes, such as rods or spheres. In accordance with one embodiment of the present invention, a high-strength proppant takes the form of a rod-shaped particle prepared by sintering andalusite alone or in combination with other materials. The rod-shaped particle may have a solid trunk bounded by two substantially parallel planes. In one embodiment of the present invention, the two substantially parallel planes may be substantially circular, thereby creating a cylindrical trunk. Other suitable shapes may be also be used as the bounding planes, although it is useful for the bounding planes to have a minimum number of angles, such as circles, ovals, or other symmetrical or asymmetrical shapes with rounded edges, such as egg curves. Angular particles tend to pack more tightly together and concentrate the pressure on the contact points between the particles because of their sharp edges, which can lead to increased pressure and an increased likelihood that the proppant will undesirably break into fine particles. Angular shapes, such as triangles, squares, rectangles, etc., where one or more of the corners is rounded may also be used as the bounding planes without departing from the spirit of the present invention. The rod bounded by these different shapes may take on trunks of different shapes, for example, in the shape of a triangular prism, without departing from the spirit of the present invention.

The rod-shaped particles may be formed using known extrusion techniques, with the following description providing one example of a suitable technique. The alumina-containing material (e.g., 100% andalusite or a combination of andalusite with other materials) may optionally be sized using various milling or grinding techniques, including both attrition grinding and autogenous grinding (i.e., grinding without a grinding medium), and may be ground by either a dry or wet grinding process. The grinding may be accomplished in a single step or may involve multiple grinding steps.

Proper sizing prior to forming the rods can increase the compacity of the feed and ultimately result in a stronger proppant or anti-flowback additive. In one embodiment, a jet mill may be used to prepare a first batch of particles having a first particle size distribution. In a jet mill, the particles are introduced into a stream of fluid, generally air, which circulates the particles and induces collisions between the particles. Using known techniques, the forces in the jet mill can alter the particle size distribution of the particles to achieve a desired distribution. For example, one may vary the type of fluid used in the mill, the shape of the milling chamber, the pressure inside the mill, the number and configuration of fluid nozzles on the mill, and whether there is a classifier that removes particles of a desired size while leaving others in the mill for additional milling. The exact configuration will vary based on the properties of the feed material and the desired output properties. The appropriate configuration for a given application can be readily determined by those skilled in the art.

After the first batch of particles having the first particle size distribution is prepared, a second batch of particles may be jet milled to a second particle size distribution. The first and second batch particle size distributions and milling conditions, and the conditions under which they are combined, are selected to form the desired final particle size distribution of the combined batches prior to sintering. Using this technique, a bi-modal particle size distribution may be obtained. The advantage of preparing a bi-modal feed is that it may contain additional fine particles to pack between the coarser particles, leading to increased compacity and density prior to sintering. Those skilled in the art will appreciate that one need not stop at two batches with different particle size distributions, but could combine three or more batches to achieve multi-modal particle size distributions prior to sintering. The batches of particles can be combined using any mixing technique known in the art for mixing dry powders, such as employing intensive mixers (e.g., Eirich mixers), which can quickly produce a homogeneous powder blend. Using this approach, it has been discovered that the resultant sintered rod achieves better compacity and crush resistance.

In another embodiment, the alumina-containing material may optionally be sized in a ball mill. Similar to jet milling multiple batches to different particle sizes and mixing them, ball milling may result in a multi-modal particle size distribution, which can improve the compacity of the powder. However, in contrast to a jet milling process, acceptable results may be achieved in a single ball-milled batch of particles (i.e., there is no requirement to prepare multiple batches and mix them). Of course, there is no technical reason to avoid combining multiple ball-milled batches, and one embodiment consistent with the present invention involves ball milling multiple batches and mixing them to form a powder with a desired multi-modal particle size distribution. In another embodiment, batches with two different particle size distributions can be simultaneously milled in the ball mill, resulting in a powder with a multi-modal particle size distribution.

Regarding the mechanics of the ball milling process, a ball mill contains a chamber in which the alumina-containing material and a collection of balls collide with each other to alter the material's particle size. The chamber and balls are typically made of ceramics or metals, such as alumina or steel. The appropriate configuration for the ball mill (e.g., the size and weight of the metal balls, the milling time, the rotation speed, etc.) can be readily determined by those skilled in the art. The ball milling process can be either a batch process or a continuous process. Various additives may also be used to increase the yields or efficiency of the milling. The additives may act as surface tension modifiers, which may increase the dispersion of fine particles and reduce the chance that the particles adhere to the walls and ball media. Suitable additives are known to those skilled in the art, and include aqueous solutions of modified hydroxylated amines and cement admixtures. In one embodiment, the ball mill is configured with an air classifier to reintroduce coarser particles back into the mill for a more accurate and controlled milling process. Like the jet milling embodiment described above, ball milling has surprisingly been discovered to result in a proppant or anti-flowback additive with improved compacity and crush resistance.

While various particle sizes and size distributions may be useful in preparing proppants and anti-flowback additives, the pre-milled alumina-containing material may have at least 95% of its particles smaller than 500 microns as measured by sieving or a Microtrac particle size analyzer, and may have all of its particles smaller than 500 microns. After milling, in certain embodiments the material has a d50 of less than 10 microns, and may have a d50 of less than 5 microns, less than 3 microns, or even less than 1.5 microns. In one embodiment, the powder has a d50 from 1.5 microns to 2 microns, and ratio of the d90 to the d10 from 4 to 8. The d10, d50, and d90 may be measured using a laser microsizer, such as the Malvern Mastersizer 2000. The milled material may also have substantially all of its particles smaller than 30 microns. A broad particle size distribution is preferred to a narrow one if enhanced strength is the goal, as it is believed that the broader distribution results in an increase of the compacity of the material and the strength of the final sintered rod.

The sintered rod in accordance with one embodiment of the present invention may be prepared by first mixing the desired alumina-containing materials with at least one binding agent and/or solvent. The binding agent and/or solvent is one of those well known in the industry. Some possible binding agents include, for example, methyl cellulose, polyvinyl butyrals, emulsified acrylates, polyvinyl alcohols, polyvinyl pyrrolidones, polyacrylics, starch, silicon binders, polyacrylates, silicates, polyethylene imine, lignosulfonates, alginates, etc. Some possible solvents may include, for example, water, alcohols, ketones, aromatic compounds, hydrocarbons, etc. Other additives well known in the industry may be added as well. For example, lubricants may be added, such as ammonium stearates, wax emulsions, elieic acid, Manhattan fish oil, stearic acid, wax, palmitic acid, linoleic acid, myristic acid, and lauric acid. Plasticizers may also be used, including polyethylene glycol, octyl phthalates, and ethylene glycol.

The mixture may then be extruded, for example, through a die, to form a rod having a cross-section of a desired shape, such as a substantially circular shape or any other suitable shape. The process of extrusion may be performed using extrusion methods known in the industry. For example, the extrusion process may be a batch process, such as by forming the rods using a piston press, or may be a continuous process using an extruder containing one or more screws. Loomis manufactures a piston press that may be used to batch produce the rods, while Dorst and ECT both make extruders that contain one or more screws that may be used in the continuous extrusion production method. Other suitable equipment and manufacturers will be readily ascertainable to those of skill in the art.

The extruded rod is then dried, for example, at about 50° C. or any other effective temperature, and reduced to the desired rod length, as needed. Any suitable drying process known to the industry may be used. For example, the rods may be dried using electric or gas driers. In some embodiments, the drying process may be performed by microwave, with a continuous drying process being preferred. The reduction to the desired length may be achieved through cutting using, for example, a rotating blade, a cross cutter, a strand cutter, a longitudinal cutter, a cutting mill, a beating mill, a roller, or any other suitable reducing mechanism. In one embodiment of the invention the reduction to the desired length occurs as a result of the drying process, forming a mixture of rods having a broad length distribution, and no cutting step is required. The length reduction occurs during the drying as a result of the mechanical properties of the extruded rod. In this embodiment, the manufacturing process is simplified and lower in cost as waste levels are reduced, cutting equipment need not be purchased nor maintained, and less energy will be consumed in the process. In another embodiment, where a narrow length distribution is desired, the rods having the desired length are obtained by any one of various selection methods known to those skilled in the art, including visual or mechanical inspection, or sieving. However, classical sieving methods tend to break the weaker rods. This is not necessarily a disadvantage, as only the stronger rods are selected by sieving. The appropriate selection method will need to be determined on a case-by-case basis, and will depend on the goal of the selection process.

Alternative forming methods may be substituted for the extrusion process discussed above. For example, rods may be molded using any suitable molding method, including stamping, injection molding, and press molding. The rods may also be formed through any suitable granulating method, including, for example, aggregating and compacting the material in a mixer, such as an Eirich mixer. The specific method of forming the rods is not considered critical, and any suitable method may be used.

The formed rod is then sintered at about 1250° C. to about 1,700° C. to form the sintered rod suitable for use as a proppant or anti-flowback additive. In some embodiments, the sintering temperature is about 1,400° C. to about 1,600° C. The sintering equipment may be any suitable equipment known in the industry, including, for example, rotary, belt, or vertical furnaces, or tunnel or pendular sintering equipment.

The sintered rods may optionally be coated with one or more coatings. Applying such a coating can provide various advantages, including the ability to control the dispersion of fines that may be generated when the rods break under injection or closure pressures. Many coatings have been suggested in the art, with U.S. Pat. No. 5,420,174 to Dewprashad providing the following non-exhaustive list of natural and synthetic coatings: "natural rubber, elastomers such as butyl rubber, and polyurethane rubber, various starches, petroleum pitch, tar, and asphalt, organic semisolid silicon polymers such as dimethyl and methylphenyl silicones, polyhydrocarbons such as polyethylene, polyproplylene, polyisobutylene, cellulose and nitrocellulose lacquers, vinyl resins such as polyvinylacetate, phenolformaldehyde resins, urea formaldehyde resins, acrylic ester resins such as polymerized esters resins of methyl, ethyl and butyl esters of acrylic and alpha-methylacrylic acids, epoxy resins, melamine resins, drying oils, mineral and petroleum waxes." Additional coatings include urethane resins, phenolic resins, epoxide phenolic resins, polyepoxide phenolic resins, novolac epoxy resins, and formaldehyde phenolic resins. One or more of these coatings can be applied to the sintered rods using any known method, including both batch and on-the-fly mixing.

The sintered rods may be formed to virtually any diameter and length suitable for use as a proppant or anti-flowback additive. In one embodiment of the present invention, the sintered rod has parallel bounding planes that are substantially circular, where the substantially circular planes have an average diameter of about 0.5 mm to about 2 mm. In some embodiments, the preferred diameters may be about 0.5 mm to about 1.5 mm. Sintered rods having a length of up to about 20 mm, preferably up to 10 mm, may be suitable for use as proppants or anti-flowback additives in accordance with embodiments of the present invention. In some embodiments, the preferred rod length may be of about 1 mm to about 5 mm, or more preferably of about 1 mm to about 4 mm.

A sintered rod having the above dimensions may have virtually any length-to-width ratio (this term is also intended to encompass the length to diameter ratio, if the rod has a substantially circular cross-section). For example, in some embodiments it may be desirable to have a length-to-width ratio of about 0.2:1 to about 20:1. In some embodiments, it may be desirable that the length-to-width ratio be of about 1.5:1 to about 10:1, more preferably of about 1.5:1 to about 7:1. It may be further preferable to restrict the length-to-width ratio of about 2:1 to about 4:1 in some embodiments. Although not required, in some embodiments it may be desirable that the sintered rod have a length-to-width ratio of greater than 1:1 because the elongated shape may introduce more disorder into the proppant pack, thereby increasing void spaces between the proppants resulting in an increased conductivity for the proppant pack.

In some embodiments, the diameter of the substantially circular planes may correspond with diameters specified in the API standard for spherical proppants. In one embodiment, the preferred rod length may be the naturally sustainable length limited by the drying process, for example, the length at which the rod will not break during the drying process. As discussed above, this approach can provide a useful proppant or anti-flowback additive without the step of cutting it to a particular length, thereby simplifying and lowering the cost of the manufacturing process, reducing waste produced during the cutting step, simplifying logistics due to the reduced need to produce, store, package, and ship proppants and anti-flowback additives of different sizes, and simplifying the planning of the fracturing job as there is no need to determine the needed length of the proppant or anti-flowback additive for a particular job.

Depending on the requirements for a particular fracture or proppant pack, the fracturing fluid may include either a narrow or broad length distribution of the rods before closure. To create a narrow length distribution, rods may be cut as described above to ensure a more uniform length distribution. More varied lengths may exist in a fracturing fluid with a broader length distribution before closure. While prior to closure a collection of sintered rods with a broad length distribution may have different physical properties from a collection having a narrow length distribution, after closure both collections of sintered rods may behave similarly in the fracture. This is primarily because the sintered rods in accordance with an embodiment of the present invention have the unique ability to break into substantially uniform rods of smaller sizes under a closing pressure. In a pack formed from a fracturing fluid of sintered rods having varied lengths, the longer rods will break first under lower closing pressure (e.g., 2,000 psi) into intermediate and smaller rods, which may break again into smaller pieces at higher closing pressure (e.g., 5,000 psi). In this way, the pack made from fracturing fluid of varied length sintered rods may ultimately achieve substantially uniform lengths at certain higher closing pressures. As used herein, rods having "substantially uniform length" are rods that have the same length, plus or minus 20%. Preferably, these rods will have the same length, plus or minus 10%.

The manner in which the sintered rods break has a number of advantages. The smaller rods behave much like their larger counterparts in the fracture, and do not behave like the detrimental fines created when conventional spherical proppants fail. Thus, there is little to no reduction in conductivity or destruction of neighboring proppants as occurs with fines in spherical proppant packs. It is also believed that the smaller rod pieces that result from breaking of a larger sintered rod exhibit the same or similar beneficial properties as the larger sintered rod. The smaller rods remain superior in their load carrying capability and resistance to embedment. Moreover, to the extent fines are generated, they are believed to be less destructive to the proppant pack than the fines generated when other proppants, such as spherical proppants, break down. This further maintains permeability and conductivity. In view of these advantages, a pack of sintered rods may therefore exhibit superior longevity, conductivity, and permeability over a pack of sintered spheres under similarly high closure pressure, even when the closing pressure causes breakage of the sintered rods. As discussed above, in some applications better performance may be achieved by using shorter rods with a narrow length distribution.

Although the sintered rods will break to the appropriate size in the fracture, it has been discovered that shorter sintered rods with a narrow length distribution may perform better than longer rods that break to the same size. Thus, for some fracturing applications it may be desirable to determine an optimum length and prepare the sintered rod accordingly. Achieving the desired length distribution may be accomplished by a) cutting the material after extrusion, such as by using a rotating knife next to the extrusion die; b) cutting the material before or after drying, such as by using a combination of mesh and knives, with the mesh being placed after the knives to sieve the rods using known sieving techniques, including the use of bouncing rubber balls on top of the mesh to aid in sieving; c) cutting the material after sintering, such as by using an Eirich mixer or a ball mill; or d) any of the other various methods for sizing known to those skilled in the art.

For certain applications, sintered rods may be preferred to spherical proppants because they increase the void volume in the proppant pack, thereby allowing more pathways for oil and natural gas to flow to the well. As an example, an experiment was conducted in which equal volumes of a spherical proppant of the prior art and a rod-shaped proppant, each with a bulk density of about 2.01 g/cm$^3$ were placed in separate Erlenmeyer flasks. Distilled water was introduced into each flask until the proppants were submerged in water. The water volume needed to penetrate the voids was then measured. The volume of water poured into the flask represents the void volume. For the spherical proppant, 5.8 mls of water was necessary to fill the void volume. For the rod-shaped proppant, 10.7 mls of water was necessary—almost double that of the spherical proppant. This comparison demonstrates that for the same volume of proppant, the rod-shaped proppant may have significantly more void volume than the same volume of a spherical proppant.

In another experiment, approximately 32.9 g each of two spherical proppants and one rod-shaped proppant were placed in separate Erlenmeyer flasks each filled with 50 mls of distilled water. The rod-shaped proppant had a broad length distribution and an average width or diameter of about 1.1 mm to about 1.3 mm. All three of the proppants had a bulk density of about 2.00 g/cm$^3$ to about 2.01 g/cm$^3$. The flasks were shaken slightly, but only to the extent necessary to provide a level surface on the top of the proppant. The volume level of the proppants was then measured, as was the level of the water. From this information, the void volume within the proppant was calculated using the following equations:

$$V_{void} = V_{proppants} - \Delta V_{liquid} \text{ where}$$

$$\Delta V_{liquid} = V_{liquid\,final} - V_{liquid\,initial}$$

The void volumes of the two spherical proppants were measured to be about 33% and about 38%, while the void volume of the rod-shaped proppant was found to be about 50%. This further demonstrates that for the same mass of proppant, a rod-shaped proppant may exhibit more void volume in the proppant pack, leading to a larger space for oil or natural gas to flow to the well bore. The flasks were then shaken and tapped for approximately 2 minutes with the goal of packing the proppant particles more tightly. The same levels were measured, and the void volume in the spherical proppants did not change in any significant manner. As expected, the void volume in the rod-shaped proppant decreased somewhat, but it still contained a void volume of about 44%. This packed void volume was still higher than that of either of the spherical proppants. Table 1 below provides the data from these experiments.

TABLE 1

| Proppant | Tapped? | Weight | $V_{initial}$ | $V_{final}$ | $V_{proppant}$ | $V_{void}$ | % voids |
|---|---|---|---|---|---|---|---|
| Spherical 1 | NO | 32.7 g | 50 ml | 60 ml | 16 ml | 6 ml | 38% |
| Spherical 1 | YES | 32.7 g | 50 ml | 60 ml | 16 ml | 6 ml | 38% |
| Spherical 2 | NO | 32.9 g | 50 ml | 60 ml | 15 ml | 5 ml | 33% |
| Spherical 2 | YES | 32.9 g | 50 ml | 60 ml | 15 ml | 5 ml | 33% |
| Rod-shaped | NO | 32.9 g | 50 ml | 59 ml | 18 ml | 9 ml | 50% |
| Rod-shaped | YES | 32.9 g | 50 ml | 59 ml | 16 ml | 7 ml | 44% |

It is also observed that the sintered rod reduces the non-Darcy flow effect (a characterization of fluid flow that accounts for the turbulence generated as the oil or natural gas flows through the proppant pack). Non-Darcy flow reduces well production significantly and strips the deposited proppants from the fracture, causing them to flow back to the well bore with the natural gas or oil. In particular, the non-Darcy flow effect is mainly experienced in high flow-rate gas and volatile oil wells. The effect arises from the fact that fluid flow near the well bore has a turbulence component due to a significant pressure drop along the fracture and the convergence of flow at the well bore, which results in high flow velocities. This effect is particularly significant in natural gas wells due to the highly expandable and less viscous nature of natural gas. The non-Darcy flow effect is expressed as:

$$dp/dl = \mu v/k + \beta \rho v^2$$

where p is the pressure drop in the fracture, l is the length of the fracture, μ is the viscosity of the gas, v is the velocity of the gas, k is the permeability of the fracture, β is the turbulence coefficient in the fracture, and ρ is the density of the natural gas/oil.

A comparison was performed with regard to three different possible proppant shapes to determine the effect of shape on the turbulence coefficient β. It was found that an elongated shape, such as the sintered rod of the present invention, is associated with a much reduced β as compared to a spherical or irregular shape. Therefore, rod-shaped proppants would be subject to less stripping due to the non-Darcy flow effect and result in less proppant flowing back to the well bore. Additional information regarding the non-Darcy flow effect can be found in *Multiphase Non-Darcy Pressure prop in Hydraulic Fracturing*, SPE 90406, by Karen E. Olson, et al., 2004.

Reducing flow back to the well has a number of advantages. For example, less flowback reduces the abrasive wear on expensive well equipment, reduces the cost of clean up, and ensures that more of the proppant stays in the pack, providing a longer useful life for the well and a better return on investment.

A sintered rod prepared as described above may have an apparent specific gravity of up to about 4, or perhaps even higher depending on what additives are selected. For certain applications, apparent specific gravities of less than 4, less than 3.9, or less than 3.2 may be desirable. In other applications, an apparent specific gravity of 2.7 or less is desirable. In certain embodiments, the apparent specific gravity may be as low as 2.0, while in other embodiments it may be as low as 2.5. The particular apparent specific gravity range chosen may be based on a variety of factors including, for example, the intended use, which may involve considerations such as fracture depth, the type of carrier fluid, etc.

While "specific gravity" is known in the art to refer to the weight per unit volume of a material as compared to the weight per unit volume of water at a given temperature, "apparent specific gravity" as used in this application refers to the weight per unit volume of a material including only the material itself and its internal porosity as compared to the weight per unit volume of water. Thus, in the apparent specific gravity computation first the weight of the material being measured is determined. Then the volume of the material, including only the volume of the material and its internal pores, is determined. For some materials, this step is easily accomplished by placing the material in water and measuring the volume of the displaced water. Indeed, under certain circumstances water may appropriately be used for applications that compare one proppant to another, such as in the void volume experiments described above. For proppants of this type, however, water may permeate and fill in the interior pores, giving inaccurate absolute results such as those desired when computing apparent specific gravity. Consequently, it is necessary to measure the displacement in mercury or some similar fluid that will not permeate the material and fill its internal pores. The weight per unit volume measured in this manner is then compared to the weight per unit volume of water at a given temperature. The specific temperature used in accordance with this application is room temperature, or about 25° C.

The sintered rod may also have a bulk density of about 0.5 g/cm$^3$ to about 2.5 g/cm$^3$. In some embodiments, the bulk density may be below about 2.0 g/cm$^3$, about 1.7 g/cm$^3$, about 1.5 g/cm$^3$, or about 1.4 g/cm$^3$. For the lower end of the range, in some embodiments the bulk density may be above about 1.0 g/cm$^3$ or about 1.2 g/cm$^3$. "Bulk density" as used in this application and understood within the art refers to the mass of a particular volume of sintered rods divided by the volume occupied by the sintered rods where the mass has been compacted. This is sometimes referred to as "packed" or "tapped" bulk density. The measurement method of the "packed" or "tapped" bulk density is that set forth by the Federation of European Producers of Abrasives (FEPA) as standard number 44-D. The volume used for the calculation of bulk density includes both the space between the sintered rods and the pore spaces (both interior and exterior) of the sintered rods.

In view of the above and the examples discussed below, sintered rods in accordance with the present invention possess a unique combination of properties that make them an excellent proppant or anti-flowback additive. Specifically, the high strength of the sintered rod ensures superior crush resistance, permeability, and conductivity at high closure pressures. Moreover, the proppant's shape enhances crush resistance, permeability, and conductivity by allowing even distribution of pressure throughout the proppant pack. In addition, the proppant's breaking behavior prevents deterioration of the pack and lowers the reduction in the pack's efficiency as compared to spherical proppants. The rod shape has the added benefit of reducing the non-Darcy flow effect in the well, thereby minimizing equipment wear and tear, maintaining consistent production of gas or oil, and reducing the cost involved in clean up of the flowback.

In accordance with another embodiment of the present invention, the proppant may take the form of spherical particles. Methods of making spherical particles are known in the art, and include various pelletization techniques.

A dry pelletizing process commonly used in the proppant manufacturing industry is described in U.S. Pat. No. 4,427,068 to Fitzgibbon. During this dry pelletizing process, a mixing device such as an Eirich Mixer having a horizontal or inclined circular table and capable of rotating at a speed of from about 10 to about 60 revolutions per minute is used to mix a ground dry power of the desired base material for forming the pellets. A rotatable impact impeller is provided inside the circular table, which rotates in an opposite direction to the rotational direction of the circular table and causes the material added to the mixer to flow over itself in a countercurrent manner. While the circular table and the impact impeller are both rotating, the dry powder for forming the pellets is continually added until the desired size of unsintered pellets is formed.

In another dry pelletizing technique, extruded, molded, or granulated rods with a 1:1 length-to-width ratio are prepared as described in the discussion of rod-shaped proppant and anti-flowback additives. Those rods are then placed in a mixer, such as an Eirich mixer, and are allowed to rub against each other to increase their sphericity. Alternatively, or in addition to using a mixer, the rods may be placed in a simple spheralizer known to those skilled in the art. The spheralizer may, for example, comprise an inclined rotating cylinder operating in batch mode.

Another known method for pelletizing spheres is a wet method. This method involves preparing an aqueous feed from the desired pellet materials and continuously atomizing the feed into a layer of already partly dried particles made from the same pellet material that is fluidized in a stream of drying air. The formed pellets are continuously retrieved from the layer and separated into desired sizes before sintering. Other pelletization techniques will be apparent to those skilled in the art, and may be used without departing from the spirit of the invention.

The pellets should then be sintered to achieve the desired composition and structure. Once the spherical particles are formed, they are dried and sintered in a manner similar to that discussed above for the rod-shaped particles (e.g., at temperatures from about 1,250° C. to about 1,700° C.).

Spherical proppants using the above methods typically have a sphericity of 0.7 or greater on the Krumbein scale. In some embodiments, the proppants or anti-flowback additives may achieve a sphericity of 0.9 or higher. As used herein, the term "substantially spherical" refers to proppants or anti-flowback additives having a sphericity of 0.7 or greater on the Krumbein scale.

Once the spheres have been sintered, they are collected and sorted by size using any method known to those skilled in the art. For example, they may be sorted through by centrifugation or sieving according to the dimensions specified in the U.S. Standard Sieve Series commonly used within the art.

A sieving analysis may involve a number of steps. In accordance with one embodiment of the present invention, sieves of desirable sizes are cleaned to ensure that they are free of loose proppants, resins, or dust. The sieves are then weighed individually and stacked on top of each other inside a base pan with the lowest sieve size (i.e., the one with the largest holes) at the top and the largest sieve size at the bottom.

The collected spheres are separated into batches of about 80 grams and weighed. Each batch is then poured into the top sieve of the stack. A lid is place upon this top sieve and firmly secured in place by an "O" ring. The stack of sieves is placed on a sieve shaker and shaken for about 10 minutes. After shaking, the sieves are individually weighed again along with the spheres that were held by the sieve. The previously recorded sieve weight is subtracted from the total sieve weight with the spheres to determine the weight of the spheres at a particular sieve size.

The total weight of the spheres in all sieves is calculated and compared to the initially recorded weight of the spheres prior to sieving to identify procedural errors. If the weight difference is within an allowable range, such as about 1%, then the process is considered to be valid and the weight of the spheres in each sieve is calculated as a percentage of the total weight of spheres from all the sieves. In this way, the sieving analysis provides an assessment of the percentages of spheres produced at various sizes in accordance with one embodiment of the present invention.

In some embodiments, the spheres for use as proppants are formed to an average diameter of about 0.1 mm to about 3 mm, which corresponds to a mesh size of about 6 to about 140 mesh. In some embodiments, it may be desirable to restrict the size ranges of the spheres from about 0.2 mm to about 2 mm, which corresponds to about 10 to about 80 mesh. It may be further desirable in some embodiments to further restrict the size of the spheres from about 0.2 mm to about 1.7 mm, which corresponds to about 12 to about 80 mesh. The choice of size may depend upon considerations such as the intended fracture depth, the choice of carrier fluid, or other factors known to those skilled in the art.

The apparent specific gravity and bulk density of the spherical particles is similar to the rod-shaped particles discussed above. Sintered spheres prepared as described above may have an apparent specific gravity of up to about 4, or perhaps even higher depending on what additives are selected. For certain applications, apparent specific gravities of less than 4, less than 3.9, or less than 3.2 may be desirable. In other applications, an apparent specific gravity of 2.7 or less is desirable. In certain embodiments, the apparent specific gravity may be as low as 2.0, while in other embodiments it may be as low as 2.5. The particular apparent specific gravity range chosen may be based on a variety of factors including, for example, the intended use, which may involve considerations such as fracture depth, the type of carrier fluid, etc.

The sintered spheres may have a bulk density of about 0.5 $g/cm^3$ to about 2.5 $g/cm^3$. In some embodiments, the bulk density may be below about 2.0 $g/cm^3$, about 1.7 $g/cm^3$, about 1.5 $g/cm^3$, or about 1.4 $g/cm^3$. For the lower end of the range, in some embodiments the bulk density may be above about 1.0 $g/cm^3$ or about 1.2 $g/cm^3$.

Although rod-shaped proppants and spherical proppants may be used by themselves in a fracture, they may have additional utility when used in conjunction with each other, or with proppants of other shapes. For example, when used in combination with other types of proppants, the presence of the rod-shaped proppant consistent with the present invention provides the advantages of increasing the void volume, decreasing proppant flowback, reducing the amount of fines generated at high pressures, and increasing the strength of other proppants. Consequently, the rod-shaped material in accordance with the present invention may be used separately as a proppant, as a proppant in combination with other proppants, or as an anti-flowback additive when mixed in certain ratios with other proppants. The proppant or anti-flowback additive of the present invention may be used alone or in combination with one or more proppants known in the art, including, but not limited to ceramic proppants, resin-coated ceramic proppants, sand (such as Ottawa frac sand or zircon sand), resin-coated sand, resin-impregnated natural materials, walnut shells, synthetic organic particles, glass microspheres, sintered bauxite, silica beads, metal particles, and any other materials currently used in the industry to prop open a fracture.

Examples—Spherical Particles

Three andalusite materials were obtained from DAMREC for formation into proppants. The first was Kerphalite® sized to about 5 μm with a loss on ignition ("LOI") of about 1.03%. The second was Purusite® sized to about 1-2 μm with an LOI of about 1.45%. The third was a "coarse" andalusite sized from about 0.3 mm to about 0.8 mm. The table below lists the weight percentages of the primary components making up each sample.

TABLE 2

| Sample | $Al_2O_3$ (wt %) | $SiO_2$ (wt %) | $Fe_2O_3$ (wt %) | $TiO_2$ (wt %) | $K_2O$ (wt %) | CaO (wt %) | MgO (wt %) | $Na_2O$ (wt %) |
|---|---|---|---|---|---|---|---|---|
| Kerphalite ® | 55.1 | 41.2 | 1.34 | 0.29 | 0.59 | 0.13 | 0.18 | 0.05 |
| Purusite ® | 59.3 | 37.7 | 0.76 | 0.19 | 0.27 | 0.16 | 0.14 | 0.03 |
| Coarse | 60.7 | 38.1 | 0.51 | 0.09 | 0.13 | 0.08 | 0.04 | 0.05 |

Some of these andalusite samples were blended with the following additives:

Comalco Bauxite—This material is a calcined bauxite from the Weipa mine in Australia. It has a typical alumina content of about 82% to about 85% by weight, and a typical silica content of about 6.5% to about 7.3% by weight. This material was jet-milled to have at least 50% of its particles smaller than 3 μm.

MetaStar® 402—This material is a meta-kaolin product that, until recently, was available from the Imerys Group. It was produced in the United Kingdom from a koalinitic clay that had been fired in a kiln and milled to ensure a high degree of reactivity. It had an alumina-to-silica ratio of about 45 to about 55. An analogous current offering from the Imerys Group is MetaStar® 501.

CK47—This material is another Imerys Group meta-kaolin. It is produced in the United States, and is ball-milled to a size of less than 2 μm.

10MOOS Talc—This material is a talc provided by Talc de Lusenac. It has a size of about 5 μm.

Spherical proppants were prepared using the following materials and mixtures:
1. 100% Kerphalite®
2. 50% Kerphalite® blended with 50% Comalco Bauxite
3. 50% Kerphalite® blended with 50% MetaStar® 402
4. 50% Kerphalite® blended with 50% CK47
5. 100% Purusite®
6. 50% Purusite® blended with 50% MetaStar® 402
7. 75% Purusite® blended with 25% MetaStar® 402
8. 99% Purusite® blended with 1% 10MOOS Talc
9. 50% Coarse andalusite blended with 50% MetaStar® 402

The materials, which were all dry powders, were formed into spherical pellets using a dry pelletizing technique described above. Specifically, the materials were blended in an Eirich Mixer (a 10 L unit with an inclined pan). The pan and the agitator were turned to the high setting to mix the powders. Water containing poly-vinyl-acetate (for use as a binder) was then added progressively to obtain a suitable consistency for pelletization. The moisture level and speed of the agitator arm were adjusted to tune the size of the pellets formed. The mixing lasted between 2 and 10 minutes. Once beads of the desired size were formed (diameters of about 0.4 mm to about 1.5 mm), the impeller arm was stopped but the pan was left to rotate to improve the roundness of the pellets. The pellets were then oven-dried and screened to obtain a collection of pellets having diameters of about 0.6 mm to about 1.0 mm. The pellets were then fired in a muffle furnace that increased the temperate by 10° C./minute until the target temperature of about 1600° C. was achieved. That temperature was held for approximately 1 hour, and the furnace was then cooled down. The sintered pellets were then screened to a size of 20-30 mesh, using US standard sieve sizes.

Crush tests were then performed on each of the samples. In this test, 10 to 20 pellets were placed on a flat surface and compressed with another flat surface until they failed. The force exerted was noted, as well as the diameters of the pellets. The force withstood was then normalized and converted into a compressive pressure by dividing the force by the cross-sectional area of the pellets. The results, which indicate what we refer to in this application as "crush strength," are shown below in Table 3. In some instances, multiple tests were performed, and the table reflects the average results of those tests.

TABLE 3

Crush Test Results

| Starting Material | Results |
|---|---|
| 100% Kerphalite ® | 77.5 MPa |
| 50% Kerphalite ® blended with 50% Comalco Bauxite | 195 MPa |
| 50% Kerphalite ® blended with 50% MetaStar ® 402 | 235 MPa |
| 50% Kerphalite ® blended with 50% CK47 | 263 MPa |
| 100% Purusite ® | 316 MPa |
| 50% Purusite ® blended with 50% MetaStar ® 402 | 277 MPa |
| 75% Purusite ® blended with 25% MetaStar ® 402 | 266 MPa |
| 99% Purusite ® blended with 1% 10MOOS Talc | 253 MPa |
| 50% Coarse andalusite blended with 50% MetaStar ® 402 | 100 MPa |

Using the same test as above, a competitive product known as CarboLite® 20/40 offered by Carbo Ceramics, Inc. yielded a crush strength of 212 MPa, significantly lower than many of the results shown in Table 3. Indeed, the average result for the 100% Purusite® sample is almost as high as the CarboProp® 20/40 product offered by Carbo Ceramics, Inc., which had a crush strength of 323 MPa but has an apparent specific gravity significantly higher than the 100% Purusite® sample.

Other blends were tested using the method above, with the pellets being sintered at 1500° C. instead of 1600° C. Table 4 contains the surprising results of the single pellet crush tests.

TABLE 4

Single Pellet Crush Test Results

| Starting Material | Results |
|---|---|
| 20% Purusite ® blended with 80% MetaStar ® 402 | 236 MPa |
| 30% Purusite ® blended with 70% MetaStar ® 402 | 262 MPa |
| 40% Purusite ® blended with 60% MetaStar ® 402 | 234 MPa |

Spherical pellets made of 100% Purusite® consistent with the present invention exhibit excellent conductivity, especially considering their apparent specific gravity. A conductivity test according to the API Recommended Practice 61 for measuring conductivity was conducted. In a particular test, a quantity of spherical pellets in accordance with one embodiment of the present invention was placed in a test cell between Ohio sandstone rocks and leveled. Ohio sandstone has a static elastic modulus of approximately 4 million psi and a permeability of 0.1 mD. Heated steel plates provided the desired temperature simulation for the test. A thermocouple was inserted into the middle portion of the spherical pellet pack to record the temperature. A servo-controlled loading ram provided a closing pressure on the proppant between the Ohio sandstone rocks. The test cell was initially 80° F. under 1,000 psi. The cell was then heated to 250° F. and held for 4 hours before the stress was increased to 5,000 psi over 40 minutes. After 50 hours at 5,000 psi, measurements were taken, and then the stress level was raised to 7,500 psi. The same procedures were applied and subsequent measurements were taken at 10,000 psi, and 12,500 psi over a total of 204 hours.

Measurements were taken of the pressure drop in the middle of the spherical pellet pack to enable calculation of the permeability at a particular stress condition according to Darcy's Law. Specifically, permeability is part of the proportionality constant in Darcy's Law, which relates flow rate and fluid physical properties (e.g., viscosity) to the stress level applied to a pack of spherical pellets. Permeability is a property specifically relating to a pack of spherical pellets, not the fluid. Conductivity, on the other hand, describes the ease with which fluid moves through spaces in a pack of spherical pellets. Conductivity depends on the intrinsic permeability of a spherical pellet pack as well as the degree of saturation. In particular, conductivity expresses the amount of water that will flow through a cross-sectional area of a spherical pellet pack under the desired stress level.

Specifically, to measure conductivity, a 70 mbar full range differential pressure transducer was started. When the differential pressure appeared to be stable, a tared volumetric cylinder was placed at the outlet and a stopwatch was started. The output from the differential pressure transducer was fed to a data collector, which recorded the output every second. Fluid was collected for 5 to 10 minutes and then the flow rate was determined by weighing the collected effluent. The mean value of the differential pressure was retrieved from a multimeter, as were the peak high and low values. If the difference between the high and low values was greater than 5% of the mean, the data was disregarded. Temperature was recorded at the start and end of the flow test period. Viscosity of the fluid was obtained using the measured temperature and viscosity tables. At least three permeability determinations were made at each stage using Darcy's Law. The standard deviation of the determined permeabilities had to be less than 1% of the mean value before the test was accepted.

The following table summarizes the results of the above conductivity tests conducted on spherical pellets made of 100% Purusite® consistent with the present invention, as well as high strength and intermediate strength spherical particles. The spheres were between about 20 mesh and about 40 mesh.

TABLE 5

Conductivity

| Pressure (psi) | Spherical Purusite ® Pellets | High Strength Spherical | Intermediate Strength Spherical |
|---|---|---|---|
| 5000 | 6728 | 5203 | 6605 |
| 7500 | 3244 | 2944 | 2216 |
| 10000 | 1432 | 1801 | 601 |
| 12500 | 466 | 954 | 181 |

All values except pressure are in mD-ft.

Spherical pellets consistent with the present invention exhibit superior crush resistance at intermediate strengths.

Crush resistance as used in this application is measured according to procedures promulgated by the API for measuring proppant crush. Specifically, a certain volume of the spherical pellets of a particular size (e.g., 20 mesh to 40 mesh) is loaded into a crush cell with a floating piston. For a desired stress level, the piston presses onto the spherical pellets at the required stress level (e.g., 7,500 psi) for a set period of time (e.g., two minutes). The weight percentage of crushed materials gathered, for example, by sieving the fines through a sieve of a desired size is measured.

Results of tests using API crush resistance procedures indicate that spherical pellets between 20 and 40 mesh made of 100% Purusite® consistent with the present invention exhibit high crush resistance at low and intermediate closure stresses. At 3,000 psi only between about 4.5% by weight and about 5.5% by weight were crushed. At 5,000 psi between about 11% by weight and about 16% by weight were crushed. The variation in the crush resistance at a given pressure is due, at least in part, to variations in the size of the spheres, the feed material, any impurities in the feed, the sintering temperature, and the sintering time.

Examples—Rod-Shaped Particles

Sintered rods consistent with the present invention also performed very well. Two sets of extruded rods were formed by mixing 78.75 g of Purusite® with 0.75 g of Methocel cellulose ether (as a binder and plasticizer) in an Eirich RO2 mixer for one minute. In a separate beaker, 18.00 g of water, 2.00 g of Novibond Mg (a lignolsulphonate that also acts as a binder), and 0.5 g of ethylene glycol (a lubricant and additive to help provide uniform drying) were mixed well. The solution was then added to the mixer over a period of about two minutes. The stirrer and bowl were both operated at high speed. For the second batch of rods, 7.5 g of extra water was added to obtain the proper consistency for extrusion, and 0.5 g of Oilasure was added as a lubricant to aid extrusion.

The resultant paste was placed in a Loomis piston press extruder, and was forced through a die consisting of 1.7 mm holes. The resulting extruded rods were laid on a metal tray and placed in an oven at a temperature of 90° C. When dry, the material was broken by hand and sieved. The desired fraction was fed into a programmable kiln. The kiln was programmed to increase in temperature by 5° C. per minute until a temperature of 850° C. was obtained. After holding the temperature at 850° C. for 120 minutes, the temperature was increased to 1600° C. in increments of 3° C. per minute. The temperature was maintained at 1600° C. for one hour.

Crush tests were then performed on each of the batches. In this test, 10 to 20 pellets were placed on a flat surface and compressed with another flat surface until they failed. The force exerted was noted, as well as the diameters of the pellets. The force withstood was then normalized and converted into a compressive pressure by dividing the force by the cross-sectional area of the pellets. The resulting crush strength is shown below in Table 6. Table 6 also provides comparative information regarding spherical products offered by Carbo Ceramics Inc.

TABLE 6

CRUSH TEST RESULTS

|  | Sintered Density (g/cm$^3$) | CFS (N/mm$^2$ = MPa) | Compressive Fracture Force (N) |
|---|---|---|---|
| Rod Batch 1 | 2.88 | 411.8 | 71.8 |
| Rod Batch 2 | 2.95 | 329.7 | 72.4 |

TABLE 6-continued

CRUSH TEST RESULTS

|  | Sintered Density (g/cm³) | CFS (N/mm² = MPa) | Compressive Fracture Force (N) |
|---|---|---|---|
| Carboprop 20/40 | 3.35 | 500 | 93.2 |
| Carbo HSP 20/40 | 3.59 | 507 | 108.1 |
| EconoProp 20/40 | 2.7 | 350 | 67.5 |
| CarboLite 20/40 | 2.64 | 344 | 74.6 |

Results of tests using API crush resistance procedures indicate that sintered rods between 12 and 14 mesh made of 100% Purusite® consistent with the present invention exhibit high crush resistance at low and intermediate closure stresses. At 3,000 psi only between about 6% by weight and about 6.5% by weight were crushed into fines smaller than 20 mesh. At 5,000 psi between about 14% by weight and about 15% by weight were crushed into fines smaller than 20 mesh. However, although the rods are initially screened very carefully, it is possible for some of them to pass through the sieves vertically (i.e., upturned with the small diameter dimension passing through the mesh). When these longer particles are crushed, they may behave differently, making it impossible to directly compare crush results of rod-shaped proppants with those of spherical proppants. The ultimate test is the conductivity test, which was discussed above and yielded surprisingly good results.

The collective results of these tests indicate that proppants made using sillimanite minerals such as andalusite can provide sufficient strength to be of value to the oil and natural gas industries. Moreover, sillimanite minerals are less expensive than high-quality bauxite or pure alumina, and are commercially available in ample supply. Consequently, the surprising discovery that sillimanite minerals may be used to prepare proppants and anti-flowback additives is a significant advance in an industry facing ever-diminishing natural resources. The proppants and anti-flowback additives made from sillimanite minerals also have a more homogeneous apparent specific gravity than clay-based materials, simplifying the design of a fracturing operation and providing more consistent results.

The preceding description is merely exemplary of various embodiments of the present invention. Those skilled in the art will recognize that various modifications may be made to the disclosed embodiments that would still be within the scope of the invention. The scope of the invention is intended to be limited only by the appended claims.

What is claimed is:

1. A proppant or anti-flowback additive comprising a sintered sillimanite mineral, wherein the proppant or anti-flowback additive has a bulk density of about 0.5 g/cm³ to about 2.5 g/cm³.

2. The proppant or anti-flowback additive of claim 1 wherein the proppant or anti-flowback additive comprises a plurality of particles, and wherein at least one of the particles is rod-shaped.

3. The proppant or anti-flowback additive of claim 2 wherein a majority of the particles are rod-shaped.

4. The proppant or anti-flowback additive of claim 3 wherein the proppant or anti-flowback additive has a circular cross-section.

5. The proppant or anti-flowback additive of claim 4 wherein the circular cross-section has an average diameter of about 0.5 mm to about 2 mm.

6. The proppant or anti-flowback additive of claim 2 wherein the proppant or anti-flowback additive has an average length-to-width ratio of about 0.2:1 to about 20:1.

7. The proppant or anti-flowback additive of claim 6 wherein the proppant or anti-flowback additive has an average length-to-width ratio of about 1.5:1 to about 4:1.

8. The proppant or anti-flowback additive of claim 6 wherein the proppant or anti-flowback additive has an average length-to-width ratio of about 4:1 to about 7:1.

9. The proppant or anti-flowback additive of claim 2 wherein the proppant or anti-flowback additive has an average length of about 0.1 mm to about 20 mm.

10. The proppant or anti-flowback additive of claim 9 wherein the proppant or anti-flowback additive has an average length of about 2 mm to about 4 mm.

11. The proppant or anti-flowback additive of claim 2 wherein the proppant or anti-flowback additive is cylindrical.

12. The proppant or anti-flowback additive of claim 1 wherein the proppant or anti-flowback additive comprises a plurality of particles, and wherein at least one of the particles is substantially spherical.

13. The proppant or anti-flowback additive of claim 12 wherein a majority of the particles are substantially spherical.

14. The proppant or anti-flowback additive of claim 13 wherein the particles have an average diameter of about 0.1 mm to about 3 mm.

15. The proppant or anti-flowback additive of claim 14 wherein the particles have an average diameter of about 0.25 mm to about 1.7 mm.

16. The proppant or anti-flowback additive of claim 13 wherein the particles have an average mesh size of about 6 mesh to about 140 mesh.

17. The proppant or anti-flowback additive of claim 13 wherein the particles have an average mesh size of about 12 mesh to about 80 mesh.

18. The proppant or anti-flowback additive of claim 1 wherein the proppant or anti-flowback additive has an apparent specific gravity less than about 4.2.

19. The proppant or anti-flowback additive of claim 18 wherein the proppant or anti-flowback additive has an apparent specific gravity of about 2.0 to about 4.2.

20. The proppant or anti-flowback additive of claim 1 wherein the proppant or anti-flowback additive has a crush strength of at least about 200 MPa.

21. The proppant or anti-flowback additive of claim 20 wherein the proppant or anti-flowback additive has a crush strength of at least about 250 MPa.

22. The proppant or anti-flowback additive of claim 1 wherein the sillimanite mineral is selected from the group consisting of kyanite, sillimanite, and andalusite.

23. The proppant or anti-flowback additive of claim 1 wherein the proppant or anti-flowback additive has a bulk density of about 1.2 g/cm³ to about 1.9 g/cm³.

24. The proppant or anti-flowback additive of claim 1 further comprising a composition selected from the group consisting of sintered bauxite, sintered kaolin, sintered metakaolin, sintered pure or technical grade alumina, sintered alumina-containing slag, and sintered zirconia.

25. The proppant or anti-flowback additive of claim 1 wherein the proppant or anti-flowback additive comprises rod-shaped particles and substantially spherical particles.

26. A method of making a proppant or anti-flowback additive comprising sintering at least one sillimanite mineral to form a proppant or anti-flowback additive, wherein the proppant or anti-flowback additive has a bulk density of about 0.5 g/cm³ to about 2.5 g/cm³.

27. The method of claim 26 further comprising milling the at least one sillimanite mineral before sintering.

28. The method of claim 27 wherein the milling comprises jet milling to achieve a material with a first particle size distribution.

29. The method of claim 28 further comprising jet milling to achieve a material with a second particle size distribution.

30. The method of claim 29 further comprising mixing the jet milled material having the first particle size distribution with the jet milled material having the second particle size distribution.

31. The method of claim 27 wherein the milling results in a material having a d50 less than 10 microns.

32. The method of claim 31 wherein the milling results in a material having a d50 less than 3 microns.

33. The method of claim 32 wherein the milling results in a material having a d50 less than 1.5 microns.

34. The method of claim 27 wherein the milling comprises ball milling.

35. The method of claim 27 wherein the milling results in a material having 95 weight percent of its particles smaller than 30 microns.

36. The method of claim 26 further comprising molding the at least one sillimanite mineral to form a rod.

37. The method of claim 36 wherein the molding is selected from the group consisting of press molding, injection molding, and stamping.

38. The method of claim 36 further comprising spheralizing the rod to form at least one substantially spherical particle.

39. The method of claim 26 wherein the sintered sillimanite mineral has an apparent specific gravity less than about 4.2.

40. The method of claim 39 wherein the sintered sillimanite mineral has an apparent specific gravity of about 2.0 to about 4.2.

41. The method of claim 26 wherein the proppant or anti-flowback additive has a crush strength of at least about 200 MPa.

42. The method of claim 41 wherein the proppant or anti-flowback additive has a crush strength of at least about 250 MPa.

43. The method of claim 26 wherein the at least one sillimanite mineral is selected from the group consisting of kyanite, sillimanite, and andalusite.

44. The method of claim 26 further comprising extruding the at least one sillimanite mineral to form a rod.

45. The method of claim 26 further comprising granulating the at least one sillimanite mineral to form a rod.

46. The method of claim 26 further comprising forming the sillimanite mineral into at least one substantially spherical particle.

47. The method of claim 26 wherein the at least one sillimanite mineral has been sintered at a temperature of about 1250° C. to about 1700° C.

48. A proppant or anti-flowback additive comprising a sintered sillimanite mineral, wherein the proppant or anti-flowback additive has an apparent specific gravity ranging from 2.6 to about 4.2.

49. The proppant or anti-flowback additive of claim 48, wherein the proppant or anti-flowback additive comprises a plurality of particles, and wherein at least one of the particles is rod-shaped.

50. The proppant or anti-flowback additive of claim 49, wherein a majority of the particles are rod-shaped.

51. The proppant or anti-flowback additive of claim 50, wherein the proppant or anti-flowback additive has a circular cross-section.

52. The proppant or anti-flowback additive of claim 51, wherein the circular cross-section has an average diameter of about 0.5 mm to about 2 mm.

53. The proppant or anti-flowback additive of claim 49, wherein the proppant or anti-flowback additive has an average length-to-width ratio of about 0.2:1 to about 20:1.

54. The proppant or anti-flowback additive of claim 53, wherein the proppant or anti-flowback additive has an average length-to-width ratio of about 1.5:1 to about 4:1.

55. The proppant or anti-flowback additive of claim 53, wherein the proppant or anti-flowback additive has an average length-to-width ratio of about 4:1 to about 7:1.

56. The proppant or anti-flowback additive of claim 49, wherein the proppant or anti-flowback additive has an average length of about 0.1 mm to about 20 mm.

57. The proppant or anti-flowback additive of claim 56, wherein the proppant or anti-flowback additive has an average length of about 2 mm to about 4 mm.

58. The proppant or anti-flowback additive of claim 49, wherein the proppant or anti-flowback additive is cylindrical.

59. The proppant or anti-flowback additive of claim 48, wherein the proppant or anti-flowback additive comprises a plurality of particles, and wherein at least one of the particles is substantially spherical.

60. The proppant or anti-flowback additive of claim 59, wherein a majority of the particles are substantially spherical.

61. The proppant or anti-flowback additive of claim 60, wherein the particles have an average diameter of about 0.1 mm to about 3 mm.

62. The proppant or anti-flowback additive of claim 61, wherein the particles have an average diameter of about 0.25 mm to about 1.7 mm.

63. The proppant or anti-flowback additive of claim 60, wherein the particles have an average mesh size of about 6 mesh to about 140 mesh.

64. The proppant or anti-flowback additive of claim 60, wherein the particles have an average mesh size of about 12 mesh to about 80 mesh.

65. The proppant or anti-flowback additive of claim 48, wherein the proppant or anti-flowback additive has a bulk density of about 0.5 g/cm$^3$ to about 2.5 g/cm$^3$.

66. The proppant or anti-flowback additive of claim 65, wherein the proppant or anti-flowback additive has a bulk density of about 1.2 g/cm$^3$ to about 1.9 g/cm$^3$.

67. The proppant or anti-flowback additive of claim 48, wherein the proppant or anti-flowback additive has a crush strength of at least about 200 MPa.

68. The proppant or anti-flowback additive of claim 67, wherein the proppant or anti-flowback additive has a crush strength of at least about 250 MPa.

69. The proppant or anti-flowback additive of claim 48, wherein the sillimanite mineral is selected from the group consisting of kyanite, sillimanite, and andalusite.

70. The proppant or anti-flowback additive of claim 48, further comprising a composition selected from the group consisting of sintered bauxite, sintered kaolin, sintered metakaolin, sintered pure or technical grade alumina, sintered alumina-containing slag, and sintered zirconia.

71. The proppant or anti-flowback additive of claim 48, wherein the proppant or anti-flowback additive comprises rod-shaped particles and substantially spherical particles.

72. A method of making a proppant or anti-flowback additive comprising sintering at least one sillimanite mineral to form a proppant or anti-flowback additive, wherein the proppant or anti-flowback additive has an apparent specific gravity ranging from 2.6 to about 4.2.

73. The method of claim 72, further comprising milling the at least one sillimanite mineral before sintering.

74. The method of claim 73, wherein the milling comprises jet milling to achieve a material with a first particle size distribution.

75. The method of claim 74, further comprising jet milling to achieve a material with a second particle size distribution.

76. The method of claim 75, further comprising mixing the jet milled material having the first particle size distribution with the jet milled material having the second particle size distribution.

77. The method of claim 73, wherein the milling results in a material having a d50 less than 10 microns.

78. The method of claim 77, wherein the milling results in a material having a d50 less than 3 microns.

79. The method of claim 78, wherein the milling results in a material having a d50 less than 1.5 microns.

80. The method of claim 73, wherein the milling comprises ball milling.

81. The method of claim 73, wherein the milling results in a material having 95 weight percent of its particles smaller than 30 microns.

82. The method of claim 72, further comprising molding the at least one sillimanite mineral to form a rod.

83. The method of claim 82, wherein the molding is selected from the group consisting of press molding, injection molding, and stamping.

84. The method of claim 82, further comprising spheralizing the rod to form at least one substantially spherical particle.

85. The method of claim 72, wherein the proppant or anti-flowback additive has a bulk density of about 0.5 g/cm$^3$ to about 2.5 g/cm$^3$.

86. The method of claim 85, wherein the proppant or anti-flowback additive has a bulk density of about 1.2 g/cm$^3$ to about 1.9 g/cm$^3$.

87. The method of claim 72, wherein the proppant or anti-flowback additive has a crush strength of at least about 200 MPa.

88. The method of claim 87, wherein the proppant or anti-flowback additive has a crush strength of at least about 250 MPa.

89. The method of claim 72, wherein the at least one sillimanite mineral is selected from the group consisting of kyanite, sillimanite, and andalusite.

90. The method of claim 72, further comprising extruding the at least one sillimanite mineral to form a rod.

91. The method of claim 72, further comprising granulating the at least one sillimanite mineral to form a rod.

92. The method of claim 72, further comprising forming the sillimanite mineral into at least one substantially spherical particle.

93. The method of claim 72, wherein the at least one sillimanite mineral has been sintered at a temperature of about 1250° C. to about 1700° C.

* * * * *